United States Patent [19]

Marks et al.

[11] 3,764,574
[45] Oct. 9, 1973

[54] ZINC-SILOXANE POLYMER AND COATING AND METHOD FOR MAKING THE SAME

[75] Inventors: Burton S. Marks, Palto Alto, Calif.;
Peter J. Chiesa, Jr., West Grove, Pa.

[73] Assignee: Lockheed Aircraft Corporation, Burbank, Calif.

[22] Filed: Aug. 13, 1970

[21] Appl. No.: 63,644

Related U.S. Application Data

[60] Division of Ser. No. 786,816, Dec. 12, 1968, which is a continuation-in-part of Ser. No. 551,398, May 19, 1966, abandoned.

[52] U.S. Cl. ........ 260/30.6 SB, 252/301.2, 260/2 S, 260/30.6 SB, 260/32.6 R,
[51] Int. Cl. ........................................... C08g 51/50
[58] Field of Search ....................... 260/30.6, 46 SE, 260/18 SI, 2 SI

[56] References Cited
OTHER PUBLICATIONS

Hornbaker et al.: Studies of Metallosiloxane Polymers: Journal of Organic Chemistry; 1959, Vol. 24; pages 1858–1861.

*Primary Examiner*—Lewis T. Jacobs
*Attorney*—George C. Sullivan

[57] ABSTRACT

A zincphenylsiloxane polymer made by reacting a zinc salt such as anhydrous zinc acetate with a difunctional diphenylsiloxane monomer such as diphenyldialkoxysilane or with a trifunctional or polyfunctional silane polymer, such as the anhydrous hydrolysis and alcoholysis product of phenyl-trichlorosilane, using heat sufficient to insure that reaction occurs (about 200°C) which can be noted by the distillation of alkyl acetate, a by-product of the reaction. The functionally of the silane monomer in the above difunctional polymer is 2, in that it reacts through its two alcoholate groups to form the ordered-sequence copolymer polyzincphenylsiloxane having the repeated bonding:

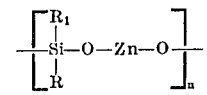

where $R_1$ is a phenyl group and $n$ is greater than 2. The zincphenylsiloxane copolymers prepared from dimers, trimers, tetramers, pentamers, and hexamers of the anhydrous hydrolysis and alcoholysis product of phenyltrichlorosilane also have all the zinc ions in between (O – Si – O) groups, but need not be strictly in ordered sequence if there are additional interspersed (O – Si – O) groups. These polymeric reactants all have a functionality greater than 2 when reacting with anhydrous zinc acetate. The zincphenylsioloxane polymer may thereafter be blended with a non-migrating plasticizer and coreactant silicone monomer and cured.

15 Claims, 1 Drawing Figure

PATENTED OCT 9 1973
3,764,574
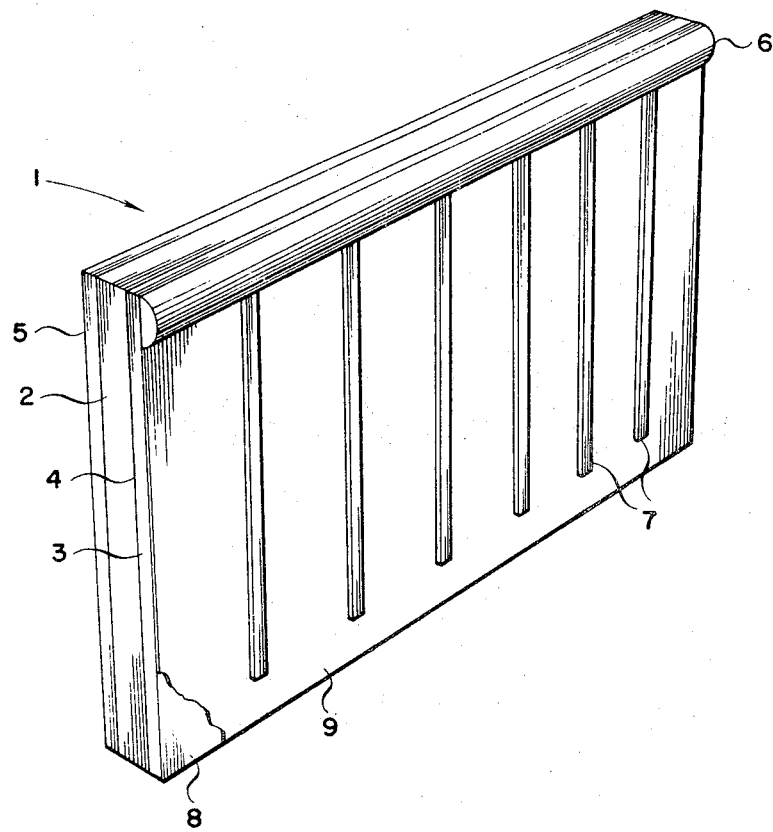
INVENTORS.
BURTON S. MARKS
PETER J. CHIESA, JR.
BY George C. Sullivan, agent
Richard H. Bryer
Attorney

ZINC-SILOXANE POLYMER AND COATING AND METHOD FOR MAKING THE SAME

This application is a Division of application Ser. No. 786,816, filed on Dec. 12, 1968, which in turn is a continuation-in-part of application Ser. No. 551,398, filed May 19, 1966 and now abandoned.

This invention relates to a novel zinc-siloxane co-polymer, to a method for making the novel co-polymer, to a novel coating product made from the co-polymer, to a method for making the coating product, to a novel solar cell, and to a method for improving the performance and life of a solar cell.

The new co-polymer has been found to be especially valuable as a coating and as a component of a coating composition which is particularly valuable for solar cells.

Heretofore, cover slides have been used with solar cells, in order to increase the emissivity of the solar cell and thereby provide a lower operating temperature, consequently raising the electric power output of the solar cell; to protect the solar cell from radiation damage by attenuating electrons and protons in the space environment; and as a substrate for blue or ultra-violet and red or infra-red reflection filters, to decrease the operating temperature, and to ensure higher solar cell efficiency.

These cover slides have given rise to several problems, such as high material costs, high labor costs, reduced emissivity, high weight factors, adhesive degradation, and unsuitability to new types of solar cells.

The high material costs arose because the cover glass or slide has generally been microsheet glass or fused silica with a dual coating system; namely, (1) an antireflective inorganic salt coating on one side, and (2) an ultra-violet reflective diffraction coating for the protection of the adhesive on the opposite side. The latter coating has been particularly expensive, being a multicoated system, with exacting thickness requirements laid down by vacuum deposition techniques.

High labor costs arose because the job of placing the slides and adhering them individually to each solar cell has required great care and precision. Furthermore, frequent breakage, particularly of the thinner cover glasses, added to the cost.

The emissivity of a cover glass coated with the antireflective inorganic salt is usually about 0.76, which (though high compared to an uncovered solar cell) is lower than is desirable.

Thick cover slides have been required for radiation protection for many missions. For others, thinner ones were sufficient. Due to the fragility of the slides, a thickness of 6 mils has usually been chosen as the minimum, yet for other requirements the thickness could be less than half this amount. So the cover slides have weighed twice or more as much as is desirable.

An adhesive was required to fasten the cover glass to the solar cell; however, the adhesive used had to be protected from ultraviolet radiation to prevent its degradation, with resulting discoloration and some loss in transmission of light.

Cover glasses may not be readily usable for new solar cell types. In particular, the use of cover slides is not easily adaptable to thin-film or dendritic types of solar cells.

One object of the present invention is to eliminate the need for the complex, costly slide-and-adhesive approach.

Another object is to provide an integral protective shield, having the form of a coating, to overcome the deficiencies and problems discussed above.

The coating of this invention has the following advantages, among others:

1. It is inexpensive materialwise in comparison to a cover glass assembly, for it can be prepared and formulated as a solution ready for application.
2. It is inexpensive laborwise, since the coating can simply be sprayed on. Furthermore, a solar cell panel can be sprayed after it is assembled, obviating special handling.
3. The coating materials of the invention have higher emissivity than cover slides (in the order of 0.84).
4. Coatings weigh very little, and the weight factor for a solar cell coating can be decided definitively. A selected coating thickness can be spray-applied to give exactly what is desired for a particular mission. Furthermore, areas which are not to be sprayed can be taped or masked during spraying.
5. New solar cell types, in particular the thin-film dendritic growth and the wrap-around types of solar cells, are admirably suited for coating protection.

Other objects and advantages of the invention will appear from the following description of some preferred embodiments.

The drawing is a perspective view of a solar cell coated according to the principles of the invention.

The New Zinc-siloxane Polymer

The new coating of this invention is based on a novel semi-organic polymer, which gives better than 97 percent light transmission in the range of 4,000–12,000 A. The resins can be cross-linked and formulated to obtain desired coating properties and to give a good over-all balance of properties when coated on solar cells.

The starting point of the invention is a new organometallic co-polymer, namely polyzincphenylsiloxane, itself useful as a coating but improved when acid-cured.

One form of this new co-polymer may typically be made, according to this invention, by reaction of a reactive zinc salt with a product prepared by partial hydrolysis followed by alcoholysis of phenyltrichlorosilane. (Typically, the hydrolysis lies at about one molecule of water per 1.75 molecules of phenyltrichlorosilane, with the ratio dropping toward 1:1 for very high polymerization, being about 1:1.2 for a hexamer.) This partially hydrolyzed and alcoholized product appears to be a mixture of dimers, tetramers and other polymers, such as pentamers and hexamers. Ethanol and methanol are the preferred alcohols. The dimer represents the following reaction:

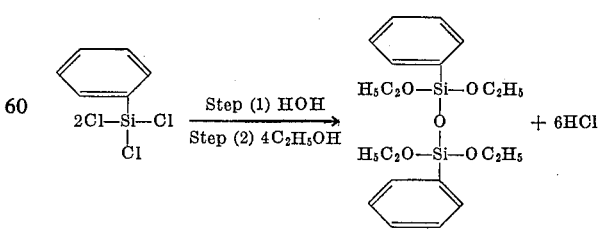

The tetramer, which comes from the same reaction, may be represented by the structure:

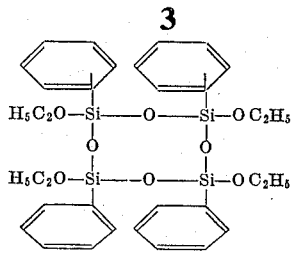

The resultant resin mixture, a colorless liquid, had a molecular weight of 500 plus and an ethoxy ($OC_2H_5$) functionality of 4. Roughly, a 1:1 ratio of the dimer and tetramer will yield such an average molecular weight and functionality; however, the actual resin probably has some higher molecular weight species as well.

This resin mixture may now be reacted with anhydrous zinc acetate, $Zn(OOCCH_3)_2$, with a maximum of one mole zinc acetate to 2 moles of ethoxy in the resin to yield the polyzincphenylsiloxane. This is really a family or mixture of compounds, including some linear or chain formations and some cyclization with zinc-containing Si-O-rings. Usually there is a mixture of the various types. Its polymerization can be followed by the evolution of ethyl acetate, and after no further ethyl acetate is evolved, the reaction is largely over. Usually, when a 1:2 molar ratio of zinc acetate to the total amount of ethoxy in the resin mixture was used, the theoretical amount of ethyl acetate was often not evolved, but upwards of 85 to 90 percent of the ethyl acetate evolved from the reaction mixture and was collected. Different molar ratios of zinc acetate to ethoxy have been prepared and satisfactory results obtained when the ratios lie in the range between 1:2 and 1:3. It was found that the best ratio for optical coatings with the specialized properties desired were prepared from molar ratios of 1:2.5 or 1:2.2 of zinc acetate to ethoxy.

In a preferred method, the polyzincphenylsiloxane is prepared by placing the phenylsiloxane resin, anhydrous zinc acetate, and (as a solvent) anhydrous 1, 2, 4-trichlorobenzene in a flask fitted with a Barrett trap. The flask is heated to about 200°C., and the ethyl acetate distills off and is collected in the Barrett trap. When no further ethyl acetate is collected, the temperature is raised to the boiling point of the solvent (213°C.) and refluxed for an hour. The solvent may then be removed by vacuum distillation to yield the clear yellow solid polyzincphenylsiloxane resin. This solid can be re-dissolved in the same solvent, if desired, or in dimethyl formamide and dimethyl acetamide, and sprayed or brushed on a surface, the solvent evaporating to yield a coating of excellent light transmission. The solid is stable at a temperature of 300°C, showing a slight darkening at 360°C.

Infrared spectra of the yellow colored resin showed the loss or diminution of the peaks characterized by the [$-O\ C_2H_5$] ethoxy groups (CH stretching frequencies for $CH_3$ and $CH_2$ 2850-2975 cm$^{-1}$; CH deformation frequency for $C-CH_3$ at ~1380 cm$^{-1}$). The spectra for polyzincphenyl-siloxane showed a broad absorption peak between 920-945 cm$^{-1}$; furthermore, a makred increase in intensity was also observed at 1,015-1,100 cm$^{-1}$. These data are representative of the bonding -Si-O-Zn-O-Si- in the resin.

A chemical analysis for zinc in the resin shows its presence within a 4 percent of the theoretical expected based on the reaction of the ethoxy groups in the resin with acetate groups of the zinc acetate to yield ethyl acetate and the

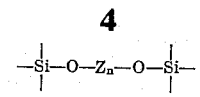

bonding in the resin.

Beside the polymeric phenylsiloxane described having a molecular weight of about 500 with an ethoxy functionality of 4, as described above, other polymeric phenylsiloxanes may be reacted with anhydrous zinc salts of $C_1$ to $C_4$ carboxylic acids such as acetate, formate, prionate, or butyrate. An example of this was a higher molecular weight homologue with a number-average molecular weight of 1,110 and an ethoxy functionality of about 6; another example has a number-average molecular weight of about 2,000 and a ethoxy functionality that could reach 8.

In these polymers prepared from the phenyltrichlorosilane, the (Si-O-Zn-O) linkage appears again and again; there is some (Si-O) bonding between some (Si-O-Zn-O) groups, but the zinc ion appears only in between two (O-Si-O) groups. The end groups are silicone entities, not zinc containing groups.

Anhydrous zinc acetate can also react with anhydrous monomeric diphenyldiethoxysilane and with anhydrous monomeric diphenyldimethoxy-silane to yield polymeric products. Hornbaker and Conrad (J. Org. Chem. 24, 1858 – 1861 (1959) reported that such polymers, with a regularly alternating arrangement of the silicon and metal atoms in the polymeric chain, could not be isolated in a stable form but degenerated into block copolymers. However, the material of this invention is stable to temperatures in excess of 300°C. The product of this reaction appears to be as follows:

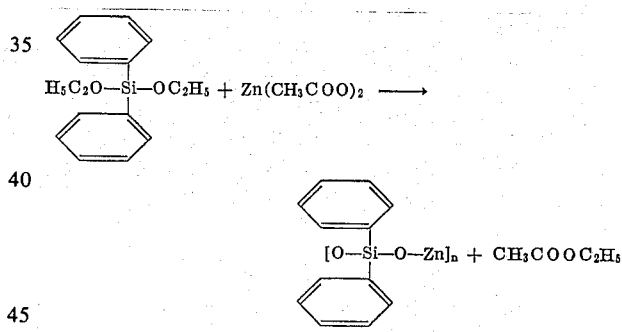

The product, after vacuum distilling off the solvent, anhydrous 1, 2, 4-trichlorobenzene, was an amber solid resin with a number-average molecular weight of 1,600. It fluoresces even in solution and in both normal and ultraviolet light. In comparison, the Hornbaker and Conrad block copolymer was stated by them to be a white powder, and they said that no molecular weight determinations could be made due to lack of its stability. In contrast, the polymer of this invention prepared from the diphenyldialkoxysilane is an ordered sequence copolymer, i.e., unlike a block copolymer or a graft copolymer the ordered sequence (Si-O-Zn-O) occurs regularly throughout the polymer molecule. The end groups may be silicone entities but probably not zinc containing entities.

USING THE POLYMER IN IMPROVED COATINGS

Preferably, the polyzincphenylsiloxane is cured or co-reacted to form a resin. The polymer prepared from phenyltrichlosilane can be cured by simple reaction with a suitable acid, preferably hydrofluoric acid. Somewhat less effective results are obtained from hydrochloric acid and hydrobromic acid, and a resin with generally good qualities but less hydrolytic stability is obtained by curing with phosphoric acid; some improvement in hydrolytic stability over the phosphoric acid resin can be obtained by using less polar phosphorus acids, such as phenylphosphoric acid, phenylphosphonic acid, and monoalkylacid phosphates. Of all acids, hydrofluoric appears to give the best hydrolytic stability.

Further increase in hydrolytic stability can be gained by including a sufficiently non-polar co-reactant, preferably the silicone monomer diphenyldihydroxysilane (diphenylsilanediol)

This monomer appears to reduce the over-all polarity of the resin and reduces the unreacted cleavage sites. Furthermore, a co-reactant polymer, such as the dimer or higher molecular weight polymer of this monomer, may be used, as long as it contains two unreacted hydroxyl groups.

The polymer of this invention prepared from diphenyldialkylsilane cannot be so cured but the starting monomers can be co-reacted with a trifunctional silane monomer such as triethoxyphenylsilane and the resulting polymer cured similarly to the above.

Brittleness of the cured resin, which is undesirable in the coating, resulting in poor thermal shock resistance, can be reduced by including a suitable non-migrating plasticizer. Excellent results have been obtained from triphenylphosphite, which is both non-migrating and able to withstand volatilization due to extreme vacuums. Other non-migrating plasticizers able to stand vacuum can be used.

The ingredients are best combined by dissolving them in any solvent in which all the ingredients are soluble and with which they have no deleterious reactions, the presently preferred solvent being dimethylformamide, with dimethylacetamide being a second choice.

Typical ranges are as follows:

| Ingredient | Parts by Weight |
|---|---|
| polyzincphenysiloxane prepared from trifunctional silane monomer, as above, | 4 |
| dimethylformamide | enough to dissolve ingredients (e.g., 8 to 60) |
| co-reactant (e.g., diphenyldihydroxysilane) | 0.5 to 2.2 |
| plasticizer (e.g., triphenylphosphite) | 0.0 to 1.0 |
| acid (e.g., hydrofluoric acid, 49%) | 0.3 to 1.0 |

When the plasticizer is added in an excessive amount, it tends to exude from the surface of the coating and to interfere with the cure and maintenance of a hard protective coating. When too little plasticizer is added, the resin tends to be brittle and less able to withstand extreme temperatures.

At between 0.6 and 0.7 parts of 49 percent HF, the surface of the coating changes from bright and shiny to dull matte.

An excellent formulation is as follows:

| Ingredient | Parts by Weight |
|---|---|
| polyzincphenylsiloxane, prepared from trifunctional silane monomer, as above. | 4 |
| dimethylformamide | 16 |
| diphenyldihydroxysilane | 1 |
| triphenylphosphite | 0.3 |
| hydrofluoric acid, 49% | 0.6 |

The polyzincphenylsiloxane is that made, as described by reacting 0.8 to 0.9 moles of anhydrous zinc acetate with 2.0 moles of the ethoxy contained in the resin prepared from the partially hydrolyzed and alcoholyzed phenyltrichlorosilane having a molecular weight of about 500 and an ethoxy functionality of 4.

The coating from this formulation is able to stand temperatures at least down to minus 160°C.

This formulation in solution form can be sprayed on to various surfaces and cured thereon to yield a coating. The properties of the coating makes it particularly attractive as an optical coating for solar cells. It shows excellent optical transmission between 3600A–12,000A, with emissivity of about 0.84 at room temperature. When this formulation was sprayed on solar cells as a 2 mil coating, the cell showed a very small short-circuit current loss, averaging 3 percent. The ultraviolet degradation of this coating after one sun year averaged 0 percent loss as measured in vacuum and 4.4 percent loss as measured in air by short-circuit current loss of solar cells. The cured coating is hydrolytically stable as measured by 24–48 hour immersion in water at ambient temperature. It also shows good adhesion to the solar cell and other substrates and is able to withstand thermal shock, as measured from plus 80°C. to minus 160°C.

SOLAR CELL COATING

The drawing shows a solar cell 1 embodying the principles of the invention. The cell 1 comprises a flat plate 2 of P-type silicon and a flat layer 3 of N-type silicon meeting at a junction 4. On the rear of the plate 2 is a backing 5 of a titanium-silver alloy, which provides the positive contact, while on the front of the N-type silicon layer 3 is a metallic strip 6 providing the negative contact. A series of grid lines 7 of titanium-silver alloy is on the front face 8 of the layer 3, and connected to the strip 6. This is a typical N/P solar cell, and, as so far described, may serve as an example of a conventional solar cell. Heretofore, there would be a cover slide (not shown) over the front face 8.

In the present invention no cover slides are used; instead a coating 9 is applied to the entire surface 8, and the coating is that described above, incorporating as its principal ingredient the new polyzincphenylsiloxane.

Application of the coating 9 to the solar cell 1 is fairly straightforward. The formulated coating is put in solution prior to use and is spray-applied to the preferably preheated (200°F.) solar cell or solar cell panel; application is followed by oven cure at 250°F. for about an hour and a half. By small changes in the relative amount of curing agent, the coating surface can be modified from a smooth bright shiny finish all the way to a matte finish.

The properties obtained with a smooth shiny finish of this invention are summarized in Table I, where they are compared with the conventionally used Corning 7940 (blue filter, 20-mil fused silica) cover slide.

TABLE I
SOLAR CELL SHIELDING

| Property | Polyzincphenlsiloxane coating 2 mils thick | Corning 7940 Fused-Silica cover slide 20 mils thick |
|---|---|---|
| 1. Emissivity, room-temperature (Lion Optical Surface Comparator) Flat Emission | 0.84 | 0.76 |

| | | |
|---|---|---|
| 2. Loss I (Short-Circuit Current) caused by covering solar cell with coating or cover | −3 % | −6 % with blue Alter |
| 3. Ultraviolet Damage; Loss I after one sun year at 2 × 10⁻⁶ torr. Loss $I_{sc}$ due to coating. | 0 % measured in vacuum −4.4 % measured in air | −1 % with Dow-Corning LTV 602 adhesive |
| 4. Electron Damage (1.5 Mev, $10^{16}$ e/cm²). Loss $I_{sc}$ due to coating | − 1 % | −4 % |
| 5. Loss $I_{sc}$, total of 2,3,4, above | −4 % under vacuum condition | −11 % |
| 6. Thermal Shock to −160°C. | Passes | Passes |
| 7. Approximate Cost, 1966, for solar cell 1 × 2 cm. | $0.125 | $1.25 |
| 8. Weight | 1 unit | 20 units |

As shown with the Lion Optical Surface Comparator at room temperature, the new coating 9 has a greater emissivity than the fused silica cover slide (0.84 vs 0.76), which in itself gives, based on the lower surface temperature, an increase in power output of about 4 percent. The blue filter used on the cover slide, however, reflects the ultraviolet solar radiaiton, also resulting in a lower solar cell surface temperature. Thus, from the standpoint of equilibrium temperature, both approaches are roughly equivalent.

Optical methods of measurement of covers and coatings were considered secondary to direct measurement of coated solar cells. The comparative measurements reported herein were all carried out in the form of current-voltage (I-V). An Optical Coating Laboratory Model 31 Solar Simulator was used as the solar simulator light source for all I–V measurements.

As shown in Table I, a 2-mil coating of this invention results in a loss of 3 percent in the solar cell's output as measured by short circuit current, compared to as much as a 6.0 percent loss by covering the solar cell with a Corning 7940 fused silica cover slide adhered to the solar cell with General Electric LTV–602 silicone polymer adhesive. The I–V curves for the two types of covered solar cells before and after coating are practically identical.

Environmental Testing

Coated solar cells were subjected to vacuum at 2 × 10⁻⁶ torr and ultraviolet radiation of 1 sun year. They showed a loss of 0 percent in short-circuit current when measured in vacuum as compared to a 1 percent loss for the conventional solar cell covered with blue-filtered Corning 7940. The ultraviolet radiation source used was argon-filled A–H6 high pressure mercure arc lamp. The lamp was mounted in the vacuum equipment and the coated or covered solar cells mounted at 1, 2, and 6 sun positions.

Using a 2 Mev Van de Graaff accelerator solar cells which were (1) conventionally covered, (2) coated with the new polyzincphenyl-siloxane coating, and (3) bare solar cells, were subjected to 1.5 Mev electron irradiation at an integrated flux of $10^{16}$ e/cm². This resulted in negligible coating damage (approxiamtely 0.5 percent $I_{sc}$). Solar cells protected by a 20-mil thick blue-filter fused silica cover slide showed a loss in excess of 3 percent due to the cover slide, as measured by short-circuit current.

Table II summarizes the electron damage results of a more recent irradiation using 1-Mev electrons and total flux of 9 × $10^{15}$ e/cm².

TABLE II

EFFECT OF ELECTRON IRRADIATION ON COVERED AND COATED SOLAR CELLS

| | No protection | Cover slide* | Cover slide* plus blue filter | 2 mil poly-zincphenyl-siloxane coating |
|---|---|---|---|---|
| 1. Electron energy at solar cell, Mev | 1 | 0.85 | 0.85 | 0.98 |
| 2. Electron damage to solar cell, $I_{sc}$ loss | 0.26 | 0.23 calc | 0.23 calc | 0.26 |
| 3. Electron damage to cover or coating, $I_{sc}$ loss | 0 | ~0.02 | ~0.04 | 0.01 |
| 4. Total $I_{sc}$ loss observed | 0.26 | 0.25 | 0.27 | 0.27 |

*The cover slide tested was a 20-mil fused silica cover slide adhesively held to the solar cell.

The energy of electrons reaching the solar cell is diminished by traversing the protective shielding. This results in reduced damage to the solar cell because of the energy dependence for electron damage. The resultant calculated loss in short-circuit current is shown in the second line. Since the 2-mil coating of this invention is relatively thin, electron energy attenuation is small and therefore damage to the solar cell by the 1-Mev electron beam is approximately equal to that for the uncovered solar cell. However, if one examines the fourth horizontal line showing the observed loss of short-circuit current after irradiation, one finds that the loss of output of the 2-mil coated cell equals the loss of the conventional 20-mil fused silica blue filtered covered cell. This apparent inconsistency may be explained by the data of line 3; namely, degradation changes in the protective cover assembly, which would appear to be tied to loss of light transmission. In the case of the blue-filtered fused-silica cover slide, the loss in transmission amounts to 4 percent, without the blue filter the loss is only 2 percent, and in the case of the coating of this invention, the loss is approximately 1 percent. Consequently, after 1-Mev electron irradiation, the resultant output of solar cells with the 2-mil coating equivalent to those with the 20-mil fused-silica blue-filter conventional cover slide.

The total loss of short circuit current due to covering or coating, U.V. damage, electron damage, as stipulated, is shown in Table I as 4 percent for solar cells protected with the 2-mil coating of this invention as compared to 11 percent for those protected with the blue filter, 20-mil fused silica cover slide.

As part of the space environment requirements studies, solar cells with the 2-mil coating of this invention were subjected to a 24-hour soak at minus 160°C. Thermal cycling was performed between minus 143°C. and plus 80°C. No discernible change in short-circuit current was evident in either test.

FLUORESCENT PROPERTIES

As shown above the new polymers of this invention, when formulated and coated on solar cells, resulted in little loss of short-circuit current as compared to the uncoated solar cell. In an attempt to explain this phenomenon, the following possible causes were investigated:

1. A possible photoelectric effect in the coating was ruled out by experiment. 2. Possible current resistance of the silicon surface decreased by the coating was ruled out when electrical resistance >$10^{11}$ ohm/sq at 1.5–100 volts showed the coating to be a good insulator and hence of no aid in carrying current.

3. Reflectivity of coating compared to that for the uncovered solar cell was ruled out when a reflectivity measurement of an uncoated solar cell and a solar cell coated by this invention showed that from 5,000–8,000A the coated solar cell gave more reflection than the uncoated cell.

4. Under black light (ultraviolet>3,100A) the coating on a glass slide was noted to fluoresce in the yellow green (5,400–5,500A), and the coating of this invention also demonstrated this effect on solar cells.

A theoretical study of the possible increase of efficiency of solar cells by the use of directed fluorescent coatings has been made by J. K. Baker (ASD—TR-6-1-689, February 1962, pp. 76–80). In his study he assumed that the fluorescent coating absorbs a large fraction of activating wavelengths and reflects away the rest, which are unused; he also assumed fluorescence at wavelength most sensitive for solar cell absorption. The difference in energy between the absorbed wavelength and the fluorescing wavelength is given off as heat, which results in reducing the efficiency of the solar cell. This heat was also included in the overall calculation to detract from the cell's power output.

In actuality, however, the coatings of this invention do not reflect the ultraviolet and hence any fluorescence obtained is a gain in output.

After integrating all the factors based on the above assumptions, Baker obtained the following equation:

$$\text{Fractional improvement in output of solar cell due to fluorescent coating} = aA_c + bB_c - 1$$

wherein:

$a$ = probability a photon will be absorbed by the coating, will be remitted by fluoescence, and absorbed by solar cell $b$ = transparency of fluorescent coating $A_c$ and $B_c$ contain factors such as solar cell response, incident solar energy, etc.

Due to the geometry of a coating on one surface, the probability "$a$"$>0.5$ is limited, and Baker also indicated that "$b$"$=0.9$ is not too likely. This, however, is not the case with the coating of this invention, where transmission of ~97% was noted. Calculations showed that wherein "$a$"$=0.50$ and "$b$"$=0.95$, their increased output ranged from 4.7 to 5%. The big rise in fractional improvement lies wherein "$a$" becomes larger than 0.5, which is diffiuclt to obtain in that it is to a large extent a fixed parameter. In any case, these values include the heat produced by fluorescence as loss in solar cell efficiency, considering all unabsorbed ultraviolet as reflected; whereas, as stated earlier, the solar cell coating of this invention does not reflect the ultraviolet (no blue filter) and hence any fluorescence obtained is a gain in output.

The resin given in the preferred example above, when cured at 250°F. for one and one-half hours, results in a yellow-green fluorescing coating when activated by ultraviolet light >3,100A.

The addition of known organic fluorescing compounds to this resin results in the fluorescing of the resin under ultraviolet irradiation. Such known organic fluorescing compounds include: anthracene, anthraquinone, 1,2-benzanthracene, fluoranthene, and 9.10-diphenylanthracene, which can be added in an amount of about 1 percent of the resin. The coating with such additives, when placed on a solar cell, enhances the electrical output of the cell as measured by solar activation.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A coating composition consisting essentially of a solution of 4 parts by weight polyzincphenylsiloxane, 0.3 to 1.0 parts by weight hydrofluoric acid, 0.0 to 1.0 parts by weight of a non-migrating plasticizer for said polyzincphenylsiloxane, and 0.5 to 2.2 parts by weight diphenyldihydroxy silane, said polyzincphenylsiloxane being the reaction product of:

a. the colorless liquid resulting from partial hydrolysis followed by alcoholysis of anhydrous phenyltrichlorosilane, said liquid having an average molecular weight of from 500 to 2,000 and an alkoxy functionality of from 4 to 8, and b. anhydrous zinc acetate, wherein the molar ratio of zinc acetate to the total number of alkoxy groups in (a) is between 1:2 and 1:3, the reaction taking place in an anhydrous solvent for the zinc acetate, said solvent having a boiling point above 200°C, so that alkyl acetate is distilled off until no more can be distilled off at that temperature, the solvent then being distilled off, said reaction product being a polyzincphenylsiloxane solid, yellow in color, and stable at a temperature of 300°C. soluble in anhydrous 1, 2, 4 - trichlorobenzene, and having each Zn ion therein bonded between two – O –Si – O - sequences, said solid having a broad infrared absorption peak between 920 and 945 $Cm^{-1}$.

2. The coating composition of claim 1 wherein said plasticizer is triphenylphosphite.

3. The coating composition of claim 1 wherein an organic fluorescent compound is incorporated therein.

4. The coating composition of claim 2 containing a fluorescent compound chosen from the group consisting of anthracene, anthraquinone, 1,2-benzanthracene, fluoranthene, and 9,10-diphenylanthracene.

5. A coating composition, consisting essentially of:

| | |
|---|---|
| polyzincphenylsiloxane | 4 parts by weight |
| diphenyldihydroxysilane | 0.5 to 2.2 parts by weight |
| a non-migrating plasticizer | 0.0 to 1.0 parts by weight |
| a strong acid | 0.3 to 1.0 parts by weight |
| dimethylformamide | enough to dissolve the ingredients | said polyzincphenylsiloxane being the polymerized reaction product of:

a. the colorless liquid resulting from partial hydrolysis followed by alcoholysis of anhydrous phenyltrichlorosilane, said liquid having an average molecular weight of from 500 to 2,000 and an alkoxy functionality of from 4 to 8, and b. anhydrous zinc acetate, wherein the molar ratio of zinc acetate to the total number of alkoxy groups in (a) is between 1:2 and 1:3 , the reaction taking place in an anhydrous solvent for the zinc acetate, said solvent having a boiling point above 200°C, so that alkyl acetate is distilled off until no more can be distilled off at that temperature, the solvent then being distilled off, said reaction product being a polyzincphenylsiloxane solid, yellow in color, and stable at a temperature of 300°C, soluble in anhydrous 1,2,4-trichlorobenzene, and having each Zn ion therein bonded between two $-$ O Si $-$ O $-$ sequences, said solid having a broad infrared absorption peak between 920 to 945 cm$^{-1}$.

6. The coating composition of claim 5 wherein said alkoxy is ethoxy.

7. The coating composition of claim 5 wherein said alkoxy is methoxy.

8. The coating composition of claim 5 consisting essentially of:

| | |
|---|---|
| the polyphenylzincsiloxane | 4 parts by weight |
| dimethylformamide | 16 parts by weight |
| diphenyldihydroxysilane | 1 part by weight |
| triphenylphosphite | 0.3 part by weight |
| hydrofluoric acid, 49 % | 0.6 part by weight | said polyphenylzincsiloxane being made by reacting 0.8 to 0.9 moles of zinc acetate with 2.0 moles of alkoxy contained in the resin prepared from hydrolized and alcoholyzed phenyltrichlorosilane and having a molecular weight of about 500 and an alkoxy functionality of 4.

9. The method of curing polyzincphenylsiloxane having the repeated groups and made by reacting a. the colorless liquid resulting from partial hydrolysis followed by alcoholysis of anhydrous phenyltrichlorosilane, said liquid having an average molecular weight of from 500 to 2,000 and an ethoxy functionality of from 4 to 8, with b. anhydrous zinc acetate, wherein the molar ratio of zinc acetate to the total number of alkoxy groups in (a) is between 1:2 and 1:3, comprising reacting 4 parts by weight of said polyzincphenylsiloxane with 0.3 to 1.0 parts by weight of a strong acid and 0.0 to 1.0 parts by weight of a non-migrating plasticizer to form a resin.

10. The method of claim 9 wherein said plasticizer is triphenylphosphite.

11. A method of making a coating composition comprising reacting in a solvent for all the ingredients, 4 parts by weight of polyzincphenylsiloxane, 0.5 to 2.2 parts by weight of diphenyldihydroxysilane, 0.0 to 1.0 parts by weight of a non-migrating plasticizer therefor, and 0.3 to 1.0 parts by weight of a strong acid, said polyzincphenylsiloxane comprising the polymerized reaction product of:

a. the colorless liquid resulting from partial hydrolysis followed by alcoholysis of anhydrous phenyltrichlorosilane, said liquid having an average molecular weight of from 500 to 2,000 and an ethoxy functionality of from 4 to 8, and b. anhydrous zinc acetate, wherein the molar ratio of zinc acetate to the total number of alkoxy groups in (a) is between 1:2 and 1:3.

12. The method of claim 11 wherein said plasticizer is triphenylphosphite.

13. The method of claim 1 wherein said acid is hydrofluoric.

14. The method of claim 11 wherein the ingredients and parts by weight are as follows:

| | |
|---|---|
| polyphenylzincsiloxane | 4 |
| dimethylformamide | 16 |
| diphenyldihydroxysilane | 1 |
| triphenylphosphite | 0.3 |
| hydrofluoric acid | 0.6 |

15. The method of claim 14 wherein said polyphenylzincsiloxane is made by reacting 0.8 to 0.9 moles of zinc acetate with 2.0 moles of ethoxy functionality contained in the resin prepared by hydrolyzing and ethanolyzing phenyltrichlorosilane.

* * * * *